(12) United States Patent
Hilbig et al.

(10) Patent No.: US 6,186,111 B1
(45) Date of Patent: Feb. 13, 2001

(54) SUPPORT ARRANGEMENT FOR THE CRANKCASE OF A RECIPROCATING PISTON INTERNAL COMBUSTION ENGINE

(75) Inventors: Jens Hilbig, Ribbesbüttel; Karsten Tremper, Braunschweig; Michael Kämpfner, Königslutter; Volker Cornelius, Braunschweig, all of (DE)

(73) Assignee: Volkswagen AG, Wolfsburg (DE)

( * ) Notice: Under 35 U.S.C. 154(b), the term of this patent shall be extended for 0 days.

(21) Appl. No.: 09/335,567

(22) Filed: Jun. 18, 1999

Related U.S. Application Data

(63) Continuation of application No. PCT/EP97/06923, filed on Dec. 11, 1997.

(30) Foreign Application Priority Data

Dec. 21, 1996 (DE) .............................................. 196 53 873

(51) Int. Cl.$^7$ ....................................................... F02F 7/00
(52) U.S. Cl. ................................. 123/195 H; 123/195 R; 123/192.2
(58) Field of Search ........................... 123/195 R, 195 A, 123/195 H, 195 S, 192.2

(56) References Cited

U.S. PATENT DOCUMENTS

| | | |
|---|---|---|
| 2,914,137 | 11/1959 | Muskegon . |
| 3,710,774 | 1/1973 | Weseloh et al. ................... 123/192.2 |
| 4,677,948 | 7/1987 | Candea ............................... 123/192.2 |
| 4,703,725 | 11/1987 | Weertman .......................... 123/192.2 |
| 5,000,140 | 3/1991 | Bates et al. ........................ 123/192.2 |
| 5,174,257 | 12/1992 | Ozawa ............................... 123/192.2 |
| 5,535,643 | * 7/1996 | Garza . |
| 5,542,387 | 8/1996 | Okubo ................................ 123/192.2 |
| 5,743,230 | * 4/1998 | Yamazaki et al. . |
| 5,794,493 | 8/1998 | Bollig et al. ............................. 74/603 |
| 5,893,346 | 4/1999 | Hosoya .............................. 123/192.2 |

FOREIGN PATENT DOCUMENTS

| | | |
|---|---|---|
| 2253605 | * 11/1972 | (DE) . |
| 4204522 | * 4/1993 | (DE) . |
| 997076 | * 12/1951 | (FR) . |
| 2720464 | * 12/1995 | (FR) . |

OTHER PUBLICATIONS

MTZ Motortechnische Zeitschrift 56, No. 9, p. 531 (1995).
MTZ Motortechnische Zeitschrift 57, No. 9, p. 496 (1996).

* cited by examiner

*Primary Examiner*—Tony M. Argenbright
*Assistant Examiner*—Hai Huynh
(74) *Attorney, Agent, or Firm*—Baker Botts L.L.P.

(57) ABSTRACT

A support arrangement for the open area of a crankcase facing an oil pan in an internal combustion engine has a plate-like component which is attached to the crankcase walls by lugs, thereby reinforcing the housing, and contains integral bearings rotatably supporting a balance shaft.

15 Claims, 7 Drawing Sheets

SUPPORT ARRANGEMENT FOR THE CRANKCASE OF A RECIPROCATING PISTON INTERNAL COMBUSTION ENGINE

This is a continuation of International application No. PCT/EP97/06923 filed Dec. 11, 1997.

BACKGROUND OF THE INVENTION

This invention relates to support arrangements for the crankcase of a reciprocating piston internal combustion engine.

German Patent No. 42 04 522 discloses a support arrangement for attaching an oil pan to a flange in a plane containing the longitudinal axis of the crankshaft of an internal combustion engine which is mounted in the open area of the crankcase facing the oil pan. In this support arrangement a dish-like component for noise damping extends in the transverse and longitudinal directions of the crankcase. A balance shaft which is at least partially enclosed by an arched projection of the disk-shaped component rotates between that component and the oil pan. The specially shaped balance shaft forms, together with the dish-shaped component, a damping chamber extending in the longitudinal direction of the crankcase which communicates with the crank mechanism located above it through an opening in the dish-shaped component. The purpose of this arrangement is to distribute the gas pulses produced by the up-and-down motion of the reciprocating pistons through the opening in directions approximately parallel to the axis of the crankshaft, and thus to avoid direct impingement of the pulsating gas columns on the oil pan.

The publication *MTZ Motortechnische Zeitschrift* 56, 1995, No. 9, page 531, discloses a reciprocating piston internal combustion engine having a crankcase with side walls which extend beyond the center of the crankshaft bearing toward an oil pan. Within the connection plane between the oil pan and the crankcase is a relatively open-work frame piece similar to that of German Patent No. 42 04 522 which extends essentially in a flat plane and has webs with through-holes for three threaded joints in each transverse plane extending between adjacent cylinders. The outer two threaded joints are connected to the crankcase side walls, while the center threaded joint is connected to the crankshaft bearing shell above it.

A further support arrangement is disclosed in *MTZ Motortechnische Zeitschrift* 57, 1996, No. 9, page 496, which describes a mass compensation drive with two balance shafts rotating in opposite directions which is integrated essentially in the region below one of the cylinders. The two balance shafts are driven through a gear located on a crank web of a central cylinder on one of the balance shafts, which in turn drives the other balance shaft in the opposite direction. In principle, this type of dual shaft balancing drive arrangement is known, for example from German Offenlegungsschrift No. 22 53 605. In this case, however, a separate bearing frame is eliminated, and mounting of the two shafts is accomplished by lengthening two bearing brackets toward the oil pan and screwing on separate bearing caps. The attachment of the shafts to the main bearing brackets makes it possible to tap the crankshaft lubricating oil supply, with all of the bearing locations of the auxiliary shafts being supplied with oil as a result of the incorporation of a comparatively large number of longitudinal holes and cross holes.

SUMMARY OF THE INVENTION

Accordingly, it is an object of the present invention to provide a support arrangement for the crankcase of an internal combustion engine which overcomes disadvantages of the prior art.

Another object of the invention is to provide a spatially optimized support arrangement for the open area of a crankcase facing an oil pan while making structural provision for a balance shaft.

These and other objects of the invention are attained by providing a support component located in the open area of the crankcase opposite an oil pan retained on a flange and extending in the transverse and longitudinal directions of the crankcase which has an essentially plate-like configuration for optimal reinforcement and which substantially separates the open area from the oil pan. To avoid undesirable transmission paths for structure-borne noise between the crank mechanism and side walls of the crankcase, the support component is attached only to the flange surrounding the open area and, at the same time, a balance shaft is supported in bearings which are integral to the support component for optimal utilization of the installation space with a high degree of functional integration. The plate-like configuration of the support component also provides the advantage that the component can serve as an oil scoop that collects lubricating oil mixed with air thrown off by the crank mechanism and directs it through defined, window-like openings into the oil pan.

In a preferred embodiment of the invention, the bearings are made in one piece in projecting bearing blocks that are integral to, and made of the same material as, the support component. In this case, for optimum utilization of space, one of the bearing blocks is integral with a wall at one end of the support component at which the drive for the balance shaft is located. The use of one-piece bearings eliminates component and assembly costs and permits insertion of the balance shaft from an end of the support component which is opposite the end containing the bearing block.

In a further preferred embodiment, the surface of the support component facing the crank mechanism is closely adjacent, at least in part, to the path of motion of the connecting rod of the crank mechanism, so that the conventional separate oil baffle plates used with ladder frames can be eliminated.

For even better utilization of space, an ancillary component of the internal combustion engine, such as an oil pump, can be mounted on the support component adjacent to an end wall and next to the balance shaft. Preferably, the drive wheel for the ancillary component rotates in a drive plane located in front of the end wall which also contains a drive wheel of the auxiliary shaft, an additional idler, and a driven gear of the crankshaft.

In a further preferred embodiment, a passage system connected by a feed passage to a main oil passage in the crankcase is provided in the support component for directing lubricating oil to the bearing locations for the auxiliary shaft.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
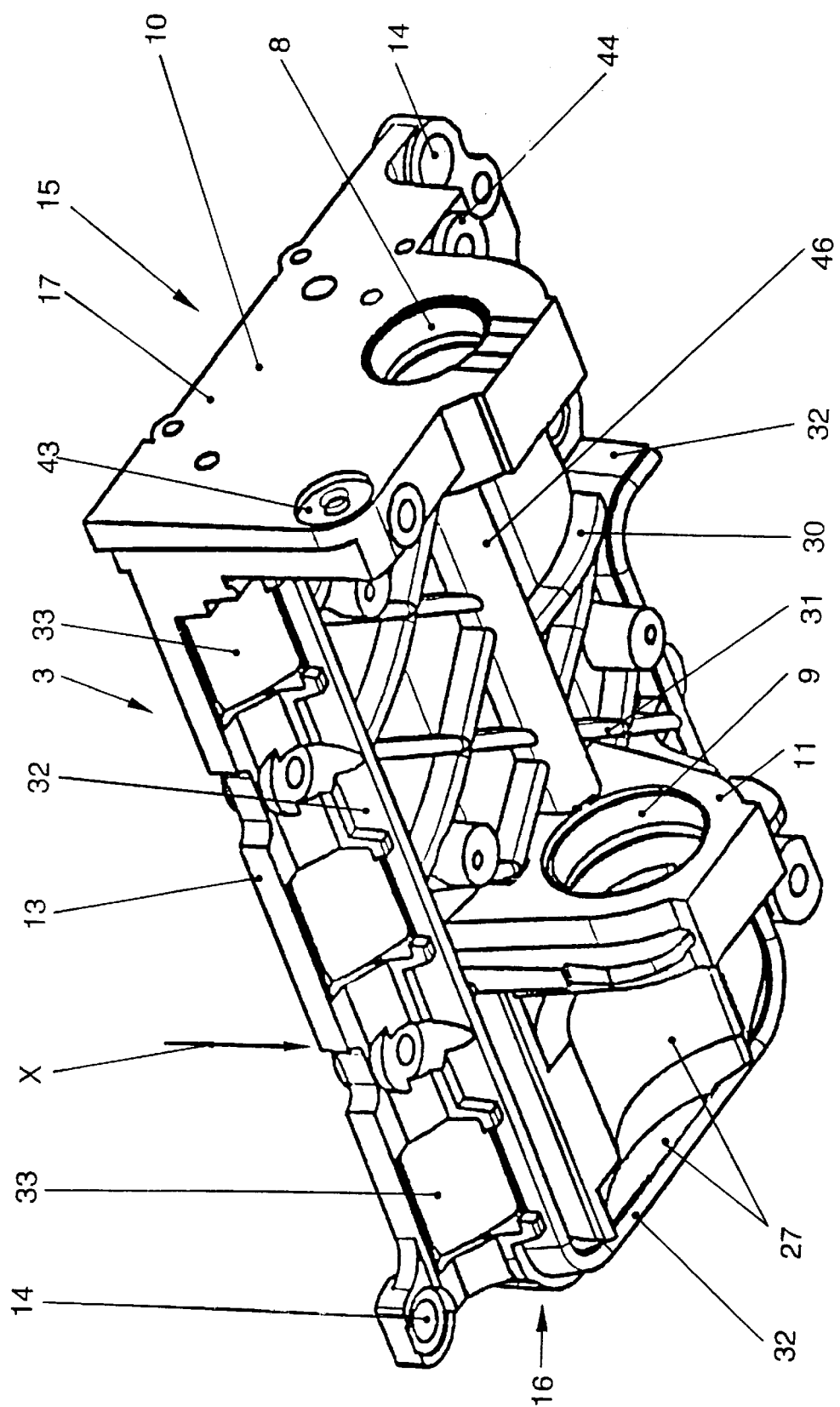
FIG. 1 is a bottom oblique perspective view illustrating a representative embodiment of an unassembled support component in accordance with the invention.

In the typical embodiment of the invention shown in the drawings, a reciprocating piston internal combustion engine has a crankcase, not shown, in which a crankshaft of a crank mechanism 4 is supported for rotation. The side walls of the crankcase extend beyond the crankshaft center line 2 (FIG. 3) in the direction toward an oil pan, not shown, to a flange plane E. Adjacent to the flange plane E is a support component 3 which is affixed to the walls of the crankcase. The support component has a plate-like configuration and extends in the longitudinal direction L (FIG. 4) and the transverse direction Q of the crankcase and, because of its connection to the flange surrounding the open area of the crankcase it largely separates the crank mechanism 4 (FIG. 2) from the oil pan.

Figure 6:
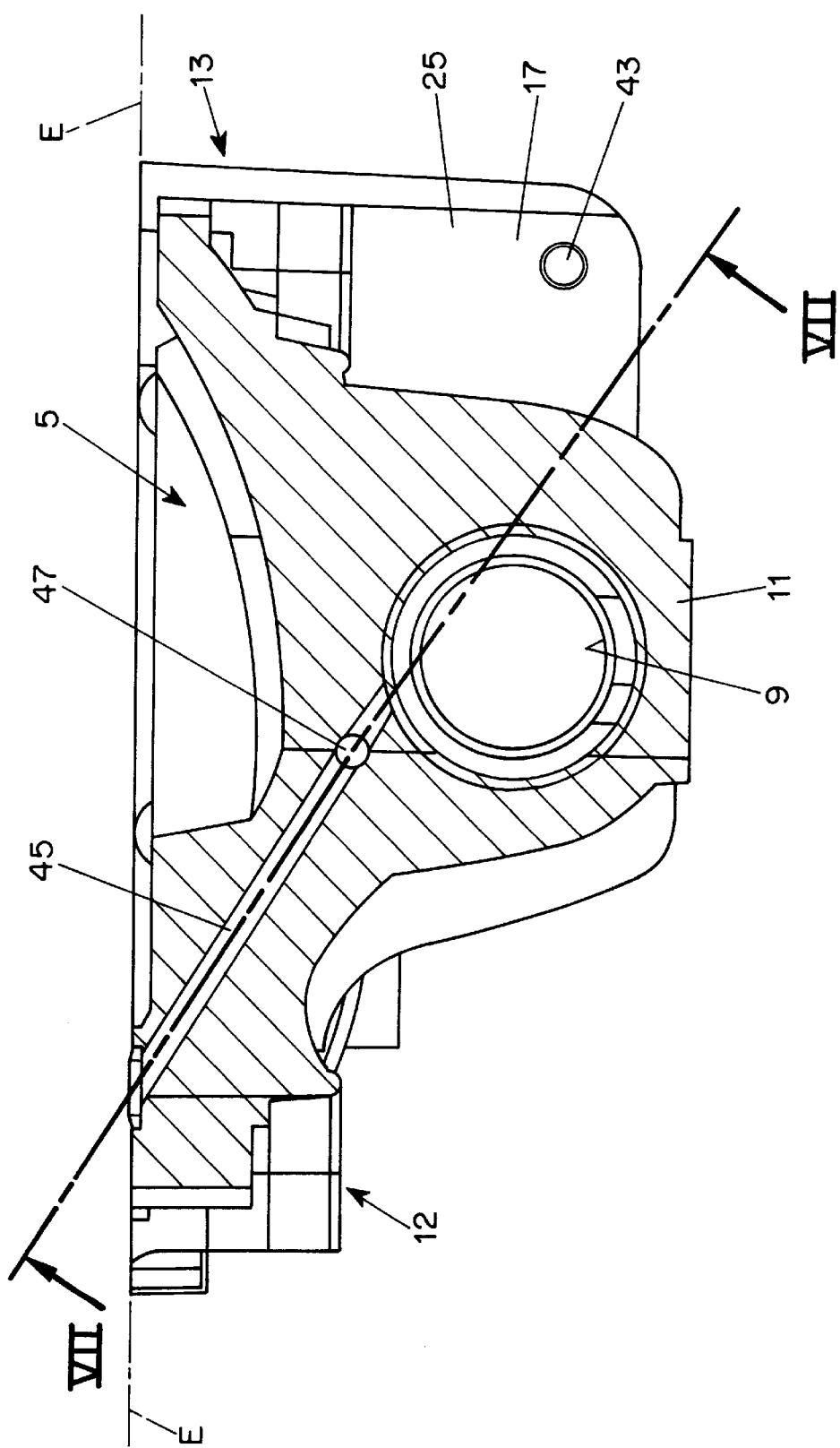
FIG. 6 is a view in cross-section taken along the line VI—VI of FIG. 5.

As shown in FIG. 6, a surface 5 of the support component 3 facing the crank mechanism 4 is shaped, at least in the region of crank webs 6 of the crank mechanism 4, to correspond to the path of the connecting rods during rotation.

Figure 5:
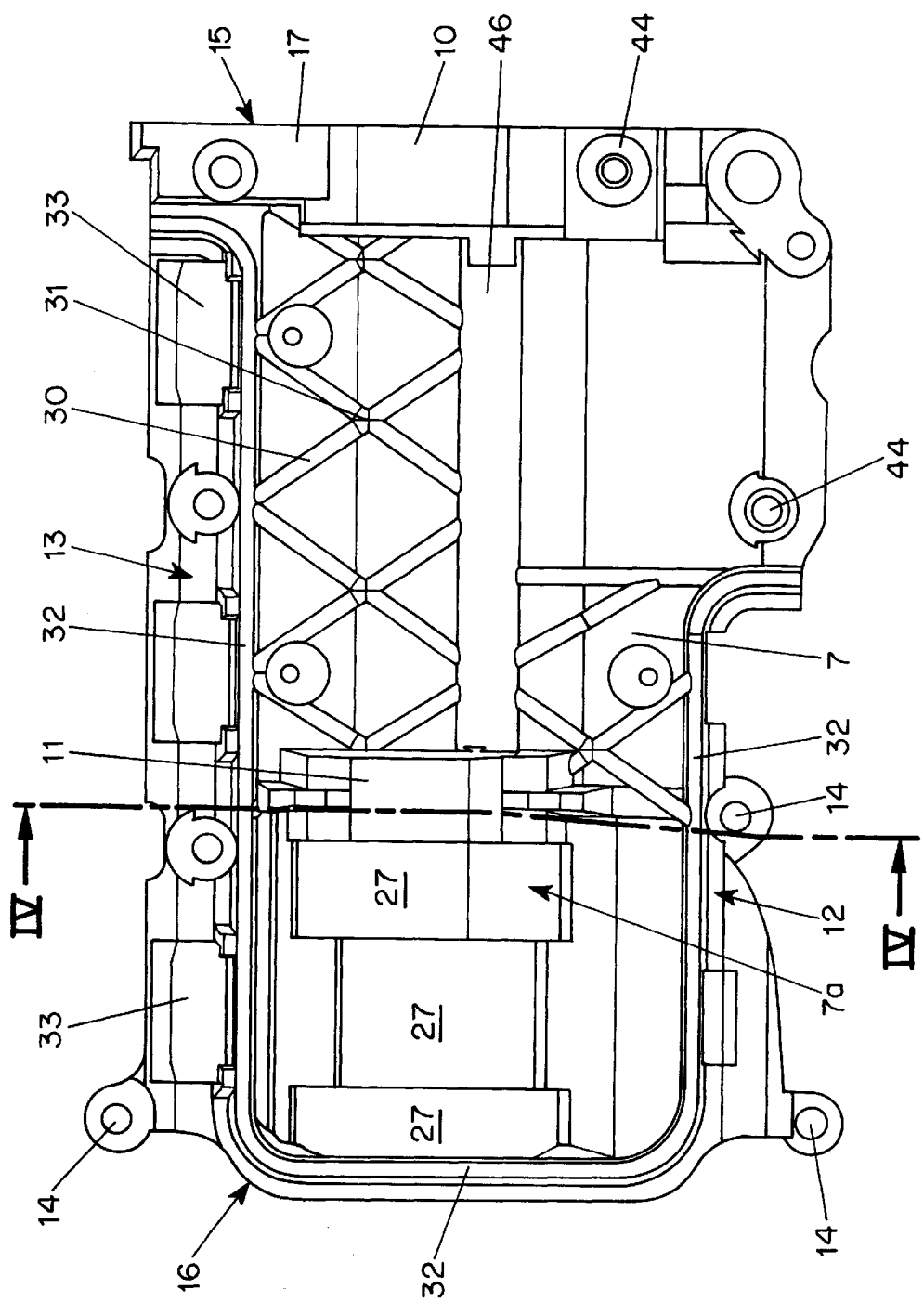
FIG. 5 is a view of the support component in the direction of arrow X in FIG. 1.

As best seen in FIG. 5, the support component 3 contains bearing blocks 10 and 11 on a surface 7 facing away from the crank mechanism 4 and facing toward the oil pan. These bearing blocks are made in one piece and are of the same material as the support component 3 and each has a corresponding one-piece bearing 8 and 9.

FIG. 5 also shows that the support component 3 is essentially rectangular in shape, and has mounting eyes 14 for receiving threaded mounting members located on its two long sides 12 and 13. The support component 3 is fixed by the threaded members to the crankcase in the flange plane E.

Two end faces 15 and 16 each extend in the lateral direction Q between and at the ends of the long sides 12 and 13 of the support component. The end face 15 constitutes a face wall 17, and, among other things, contains the integral bearing block 10.

Figure 2:
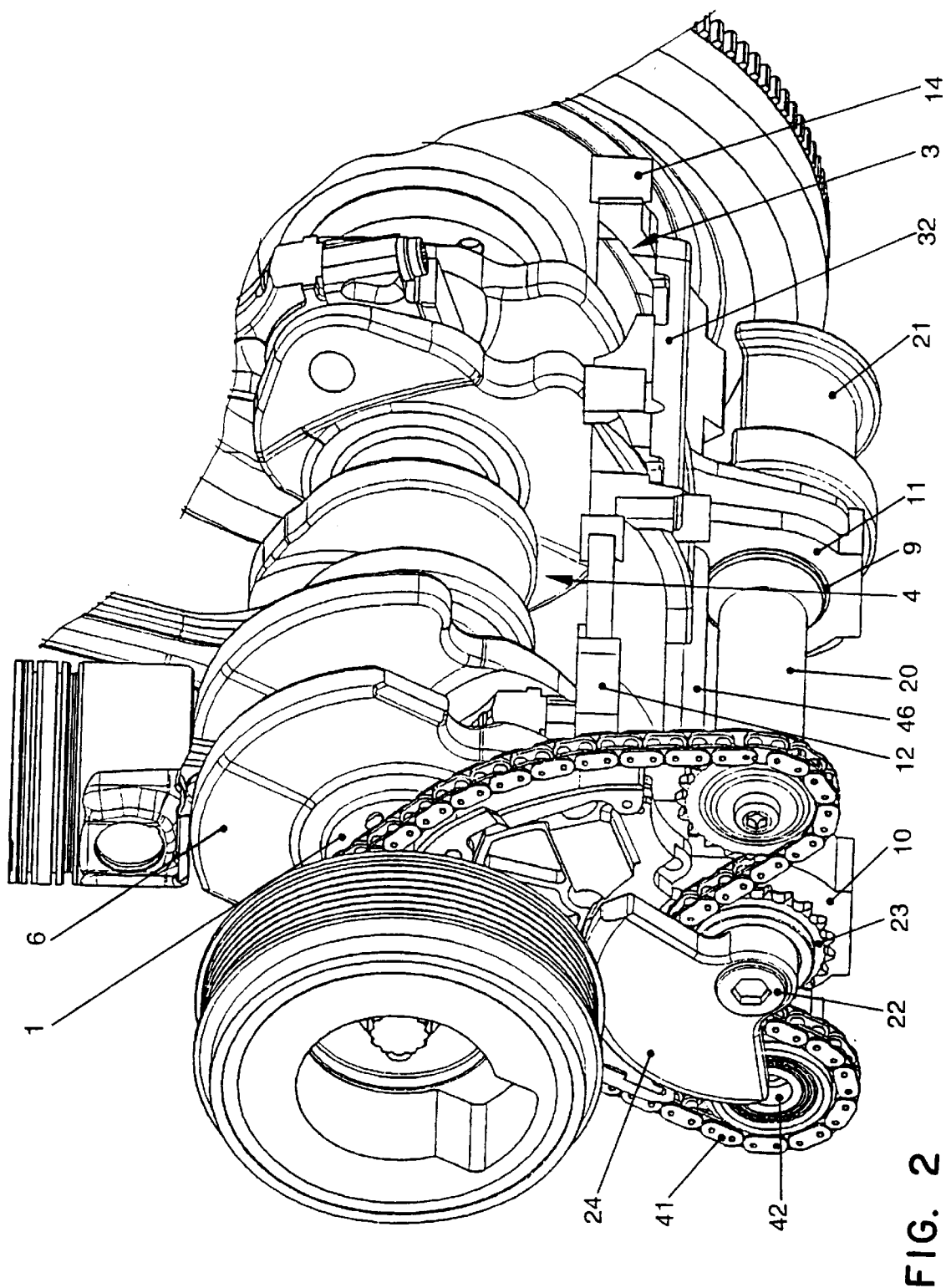
FIG. 2 is a perspective view of the support component of FIG. 1 installed in a reciprocating piston internal combustion engine, showing part of the crank mechanism without the crankcase.
Figure 3:
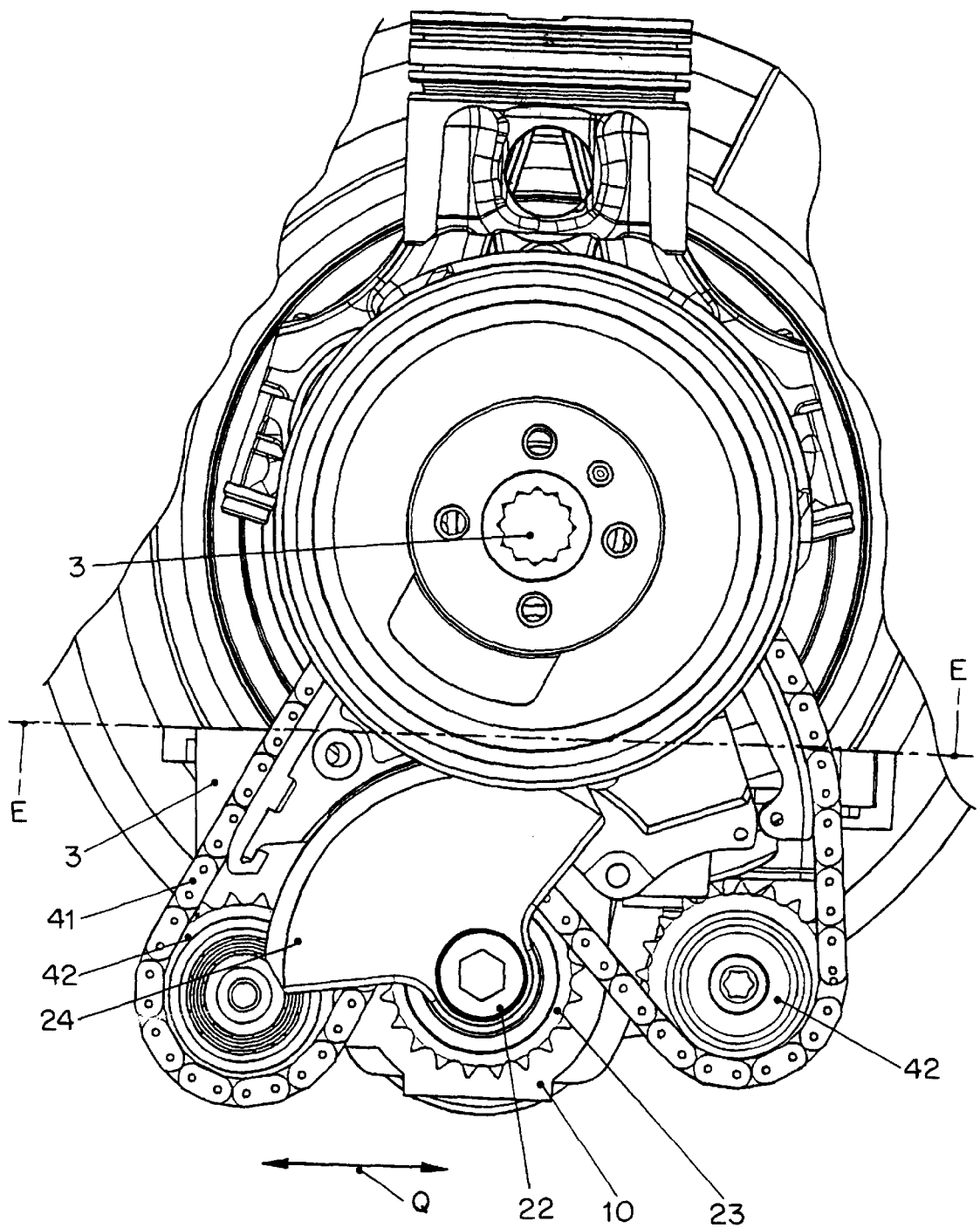
FIG. 3 is an end view of the engine crank mechanism and support component shown in FIG. 2.
Figure 4:
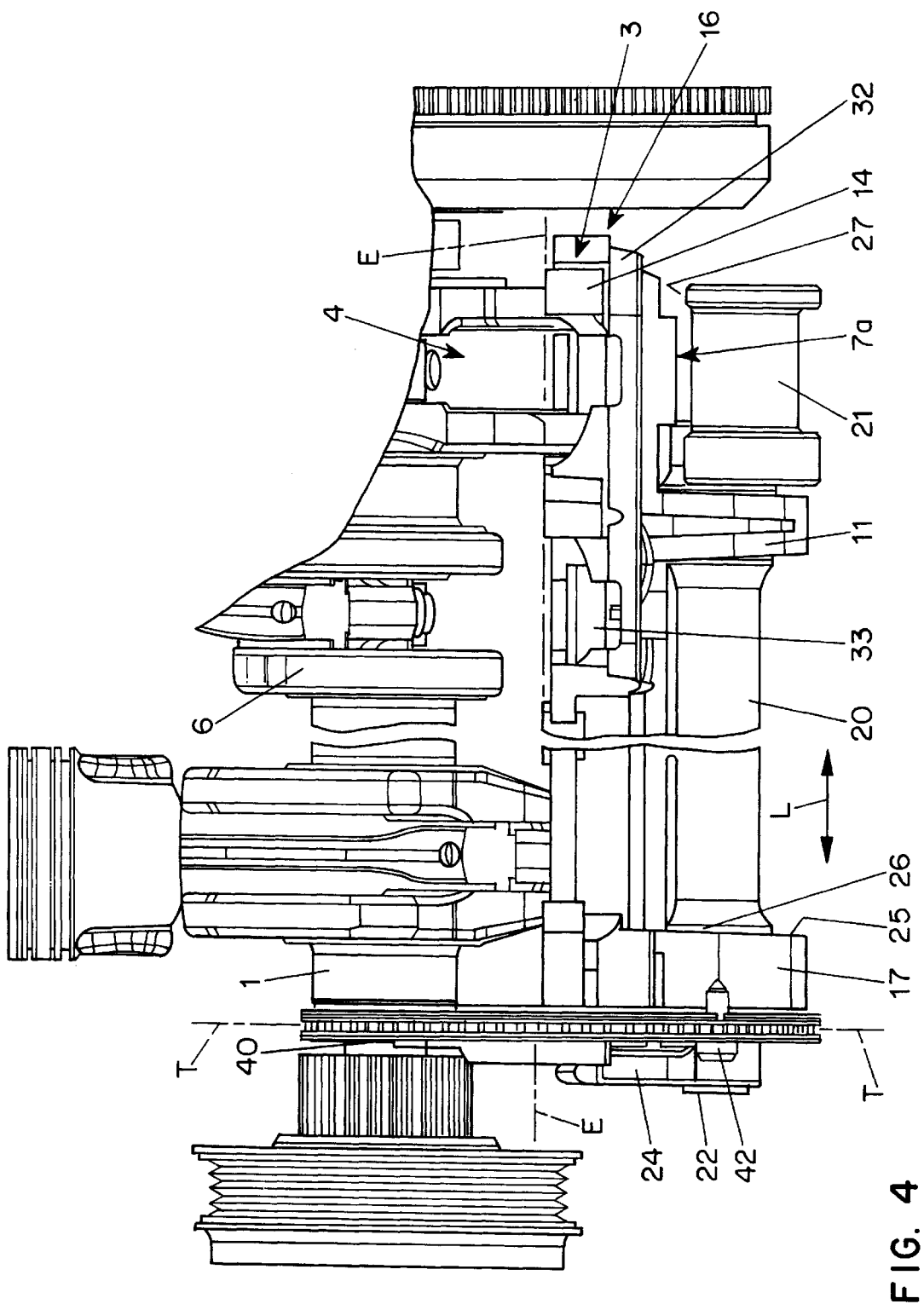
FIG. 4 is a side view of the engine crank mechanism and support component shown in FIG. 2.

In the assembled state of the crank mechanism and support component 3, as shown in FIGS. 2, 3 and 4, a balance shaft 20 is rotatably supported in the bearings 8 and 9. The balance shaft is integral to and of one piece with a balancing mass 21 and is inserted starting from the end 16, first through the bearing 9 and subsequently through the bearing 8. The balance shaft 20 has a stepped journal 22 which passes through the bearing 8 and which supports a drive wheel 23 in the form of a sprocket and an additional balancing mass 24. This arrangement, together with a collar 26 of the balance shaft 20 adjacent to the inner side 25 of the end wall 17, provides axial support while permitting the bearing 9 to be rotatable.

The cantilevered support of the balancing mass 21 assures that the balancing mass 21 approaches the surface 7 in a way that is optimum for installation space. In this regard, the surface 7 has a section 7a (FIGS. 1 and 5) with contoured surfaces 27 which are appropriately shaped for providing a clearance for the balancing mass.

Between the two bearing blocks 10 and 11, the surface 7 has intersecting reinforcement ribs 30 that intersect at intersection points 31. As shown in FIGS. 1 and 5, the surface 7 also has a web 32 which is adjacent to a casing (not shown) of the drive shaft 20. The web 32 extends from the end wall 17 spaced from and parallel to the long side wall 13, along the end wall 16 and, offset inwardly again, along and essentially parallel to the other long side wall 12. Window-like openings 33 are provided between the long side walls 12 and 13 and in the web 32 for passage of lubricating oil of the crank mechanism 4 to the oil pan.

As shown in FIG. 4, the balance shaft 20 is driven by a driven gear 40 on the crankshaft 1 and the driven gear 40, together with the drive wheel 23, defines a drive plane T for a drive chain 41. As seen best in FIGS. 2 and 3, the chain 41 drives the balance shaft 20 with its opposite side for reversal of rotation. For this purpose, two idlers 42 are provided, one of the idlers 42 being rotatably supported in a bearing 43 of the end wall 17.

The other idler 42 serves as a drive wheel for an oil pump (not shown) of the reciprocating piston internal combustion engine. For optimal utilization of space, the oil pump is removably mounted on the support component 3 between the inner side 25 of the end wall 17 and the surface 7, at a location next to the balance shaft 20. For this purpose, the surface 7 has attachment points 44 as shown in FIGS. 1 and 5.

Figure 7:
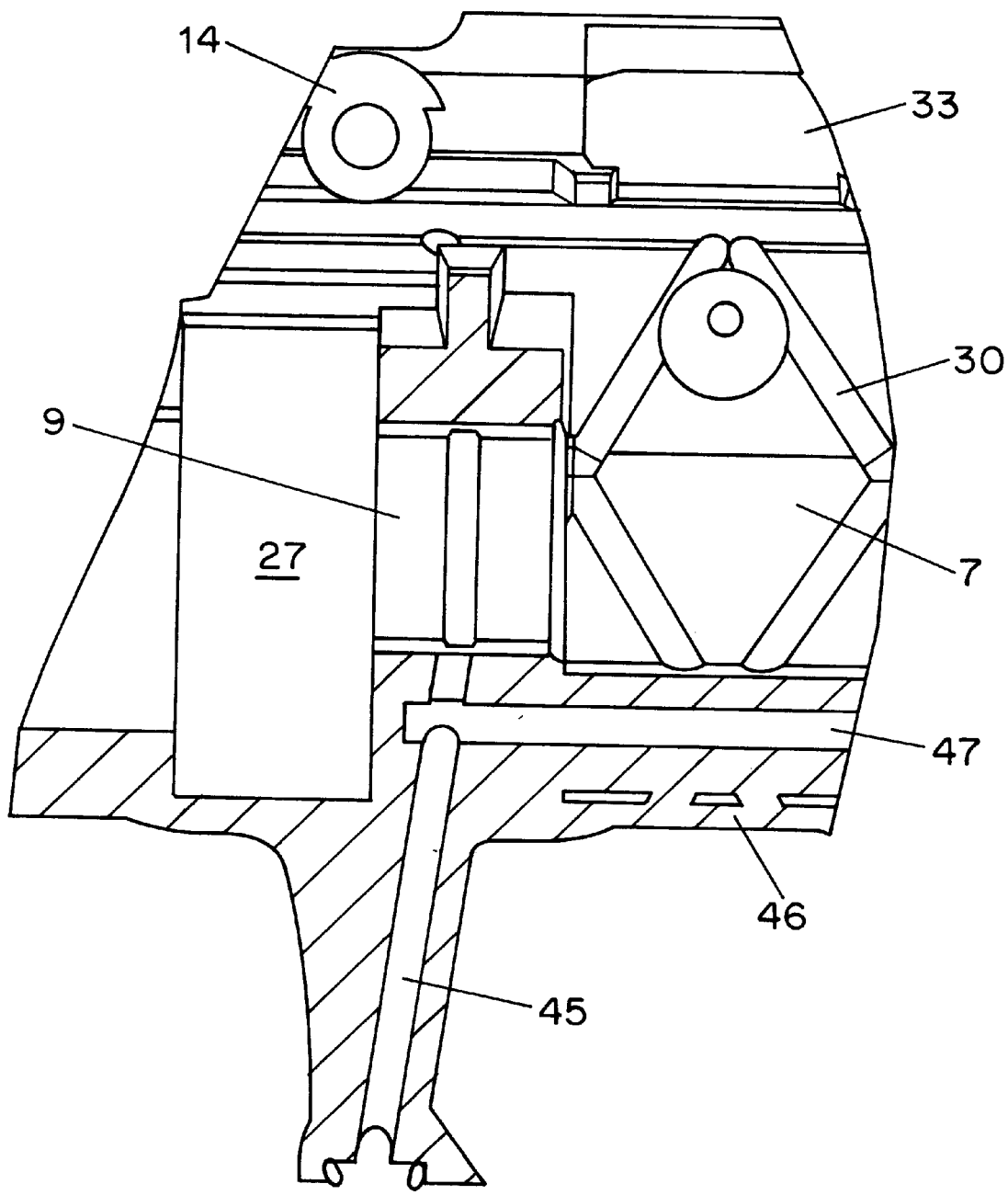
FIG. 7 is a view in cross-section taken along the line VII—VII of FIG. 6.

To supply the bearings 8 and 9 with lubricating oil and to avoid external supply lines, the support component 3 has a passage system for lubricating oil. Starting at the flange plane E, an essentially transverse feed passage 45 extends through the bearing block 11 to the bearing 9 as shown in FIG. 6. A supply passage 47 in a shaft 46 projecting from the surface 7 intersecting the feed passage 45 extends parallel to the balance shaft 20, which conveys the supplied lubricating oil to the bearing 8 as shown in FIG. 7. A projection 46 of the surface 7 contains a supply passage 47 which extends along a series of intersection points 31.

Although the invention has been described herein with reference to a specific embodiment, many modifications and variations therein will readily occur to those skilled in the art. Accordingly, all such variations and modifications are included within the intended scope of the invention.

We claim:

1. A support arrangement for a reciprocating piston internal combustion engine comprising a support component mounted in an open area of a crankcase containing a crank mechanism of an internal combustion engine opposite an oil pan retained on the crankcase and extending in both the transverse direction and the longitudinal direction of the crankcase, and a balance shaft rotatably supported between the support component and the oil pan which is at least partially enclosed by an arched projection of the support component, wherein the support component has a plate configuration and substantially separates the open area of the crankcase from the oil pan, and wherein the support component is attached only to a flange of the crankcase surrounding the open area of the crankcase by a plurality of detachable connections, and the balance shaft is supported in bearing blocks which are integral with the support component.

2. A support arrangement in accordance with claim 1 wherein the flange defines a flange plane which is spaced from the center of the crankshaft in a direction toward the oil plan.

3. A support arrangement in accordance with claim 2 wherein a surface of the support component facing the crank mechanism is shaped to conform, at least in part, to the path of a connecting rod of the crank mechanism.

4. A support arrangement in accordance with claim 1 wherein the support component has bearing blocks for the balance shaft projecting from a surface facing the oil pan.

5. A support arrangement in accordance with claim 4 wherein the support component has an essentially rectangular shape conforming to the open area of the crankcase, and a first bearing block is at one of two ends of the support component.

6. A support arrangement in accordance with claim 4 wherein the bearing blocks are made in one piece with and of the same material as the support component.

7. A support arrangement in accordance with claim 5 wherein a second bearing block is located between the two ends of the support component and including a balancing mass on the balancing shaft between the second bearing block and the end which is opposite the end containing the first bearing block.

8. A support arrangement in accordance with claim 5 including a balancing mass on the balancing shaft located beyond the end of the support containing a bearing block.

9. A support arrangement in accordance with claim 8 wherein the first bearing block is integral with an end wall of the support component and including an idler mounted on the end wall for a drive arrangement for driving the balance shaft.

10. A support arrangement in accordance with claim 9 wherein the idler rotates in a drive plane which is between the balancing mass and the end wall.

11. A support arrangement in accordance with claim 10 including a drive wheel of the balance shaft and an additional idler, also located in the drive plane, acting as a drive wheel for an ancillary component of the reciprocating piston internal combustion engine.

12. A support arrangement in accordance with claim 11 wherein the ancillary component is removably mounted on the support component adjacent to the balance shaft.

13. A support arrangement in accordance with claim 4 wherein the support component includes a passage arrangement for lubricating oil which includes at least one passage in the region of a bearing block to supply oil to a bearing therein and which receives oil from the flange.

14. A support arrangement in accordance with claim 13 including a supply passage in the support component extending parallel to the balance shaft and which intersects the feed passage and is connected to the bearing blocks.

15. A support arrangement in accordance with claim 13 including intersecting reinforcement ribs on a surface of the support component which run diagonally and intersect with each other and wherein a supply passage extends through a series of intersection points in the reinforcement ribs.

* * * * *